US012559811B2

(12) United States Patent
Nakamura et al.

(10) Patent No.: US 12,559,811 B2
(45) Date of Patent: Feb. 24, 2026

(54) HEAT TREATMENT APPARATUS

(71) Applicant: Noritake Co., Limited, Nagoya (JP)

(72) Inventors: Hidenori Nakamura, Nagoya (JP); Hideki Yonekawa, Nagoya (JP); Hiroshi Ishida, Nagoya (JP); Hideaki Ohi, Nagoya (JP); Masanobu Kato, Nagoya (JP)

(73) Assignee: Noritake Co., Limited, Nagoya (JP)

( * ) Notice: Subject to any disclaimer, the term of this patent is extended or adjusted under 35 U.S.C. 154(b) by 372 days.

(21) Appl. No.: 18/337,863

(22) Filed: Jun. 20, 2023

(65) Prior Publication Data

US 2023/0407426 A1 Dec. 21, 2023

(30) Foreign Application Priority Data

Jun. 21, 2022 (JP) ................................ 2022-099587

(51) Int. Cl.
*C21D 9/00* (2006.01)
*C21D 11/00* (2006.01)
*F27D 15/02* (2006.01)

(52) U.S. Cl.
CPC ......... *C21D 9/0062* (2013.01); *C21D 9/0012* (2013.01); *C21D 11/00* (2013.01); *F27D 15/028* (2013.01)

(58) Field of Classification Search
CPC .... C21D 9/0062; C21D 9/0012; C21D 11/00; F26B 25/20; F27D 15/028
See application file for complete search history.

(56) References Cited

U.S. PATENT DOCUMENTS

2012/0328272 A1 12/2012 Fujita et al.
2017/0370648 A1* 12/2017 Katsumata ........... C21D 9/0018

FOREIGN PATENT DOCUMENTS

| | | |
|---|---|---|
| CN | 110541132 | 12/2019 |
| EP | 0614992 | 9/1994 |
| EP | 3896375 | 10/2021 |
| JP | S47018646 | 5/1972 |
| JP | S5732334 | 2/1982 |
| JP | U06008813 | 2/1994 |
| JP | H06340928 | 12/1994 |
| JP | 2012132662 | 7/2012 |

(Continued)

OTHER PUBLICATIONS

Notice of Reasons for Refusal, JP Appln. 2022-099587, JPO, 7 pgs Sep. 22, 2022.

(Continued)

*Primary Examiner* — Jessee R Roe
(74) *Attorney, Agent, or Firm* — Gerald W. Roberts; John V. Daniluck; Dentons Bingham Greenebaum LLP

(57) ABSTRACT

According to the present disclosure, a heat treatment apparatus includes a heating treatment unit that heat-treats a strip-shaped sheet while transferring the strip-shaped sheet, and a cooling unit that cools the strip-shaped sheet having been heat-treated in the heating treatment unit while transferring the strip-shaped sheet. The cooling unit includes a cooling roller that allows a refrigerant to flow through the inside thereof, and an outer wall that surrounds the space in which the cooling roller is disposed. The heat treatment apparatus may further include a take-up unit in which the strip-shaped sheet having been cooled in the cooling unit is wound.

9 Claims, 3 Drawing Sheets

(56) References Cited

FOREIGN PATENT DOCUMENTS

| | | |
|---|---|---|
| JP | 2017211151 | 11/2017 |
| JP | 2021085066 | 6/2021 |
| JP | 2022102916 | 7/2022 |
| WO | 2021166048 | 8/2021 |

OTHER PUBLICATIONS

Notice of Reasons for Refusal, JP Appln. 2022-099587, JPO, 6 pgs Dec. 28, 2022.

* cited by examiner

HEAT TREATMENT APPARATUS

CROSS REFERENCE TO RELATED APPLICATION(S)

The present application claims priority from Japanese Patent Application No. 2022-099587 filed on Jun. 21, 2022, which is incorporated by reference herein in its entirety.

FIELD OF THE INVENTION

The present disclosure relates to a heat treatment apparatus.

BACKGROUND OF THE INVENTION

WO/2021/166048 discloses a heat treatment apparatus for heat treating a strip-shaped treatment object. The heat treatment apparatus disclosed in the publication includes a furnace body, a conveyor device, a plurality of guide rollers, and a heating device. The furnace body includes a treatment chamber disclosed between an inlet and an outlet. The conveyor device conveys the treatment object, which spans from the inlet to the outlet, from the inlet through the treatment chamber to the outlet. The plurality of guide rollers guide the treatment object within the treatment chamber. The heating device heats the treatment object within the treatment chamber. The treatment object is conveyed from the inlet to the outlet through a transfer path defined by the plurality of guide rollers. The heating device includes a first heater disposed near a guide roller and a second heater disposed near the intermediate position between guide rollers adjacent to each other along the conveying direction of the treatment object. The second heater is a heater that emits electromagnetic waves in the infrared region. It is stated that such a heat treatment apparatus can efficiently heat-treat the treatment object.

JP 2012-132662 A discloses a coating film drying furnace that dries a coating film having an absorption spectrum of electromagnetic waves of 3.5 μm or less and having a hydrogen bond while causing the coating film to travel inside a furnace body. The coating film drying furnace includes an infrared heater inside the furnace body. In the infrared heater, the outer circumference of a filament is covered concentrically by a pipe that functions as a low-pass filter. A heater having a structure in which a fluid passage is formed between a plurality of pipes is used as the infrared heater. It is said that such a coating film drying furnace can heat and dry a coating film efficiently and continuously.

SUMMARY OF THE INVENTION

The present inventors believe that it is desirable to improve the processing efficiency in heat treating a strip-shaped sheet continuously while transferring the sheet.

According to the present disclosure, a heat treatment apparatus includes a heating treatment unit that heat-treats a strip-shaped sheet while transferring the strip-shaped sheet, and a cooling unit that cools the strip-shaped sheet having been heat-treated in the heating treatment unit while transferring the strip-shaped sheet. The cooling unit includes a cooling roller that allows a refrigerant to flow through the inside thereof, and an outer wall that surrounds the space in which the cooling roller is disposed. The just-described heat treatment apparatus is able to efficiently cools and takes up the strip-shaped sheet that has been heat-treated. This improves the processing efficiency in continuously heat treating the strip-shaped sheet while transferring the sheet. Although it is possible that a single cooling roller may be provided, it is more preferable that a plurality of cooling rollers be provided.

DESCRIPTION OF THE PREFERRED EMBODIMENTS

Figure 1:
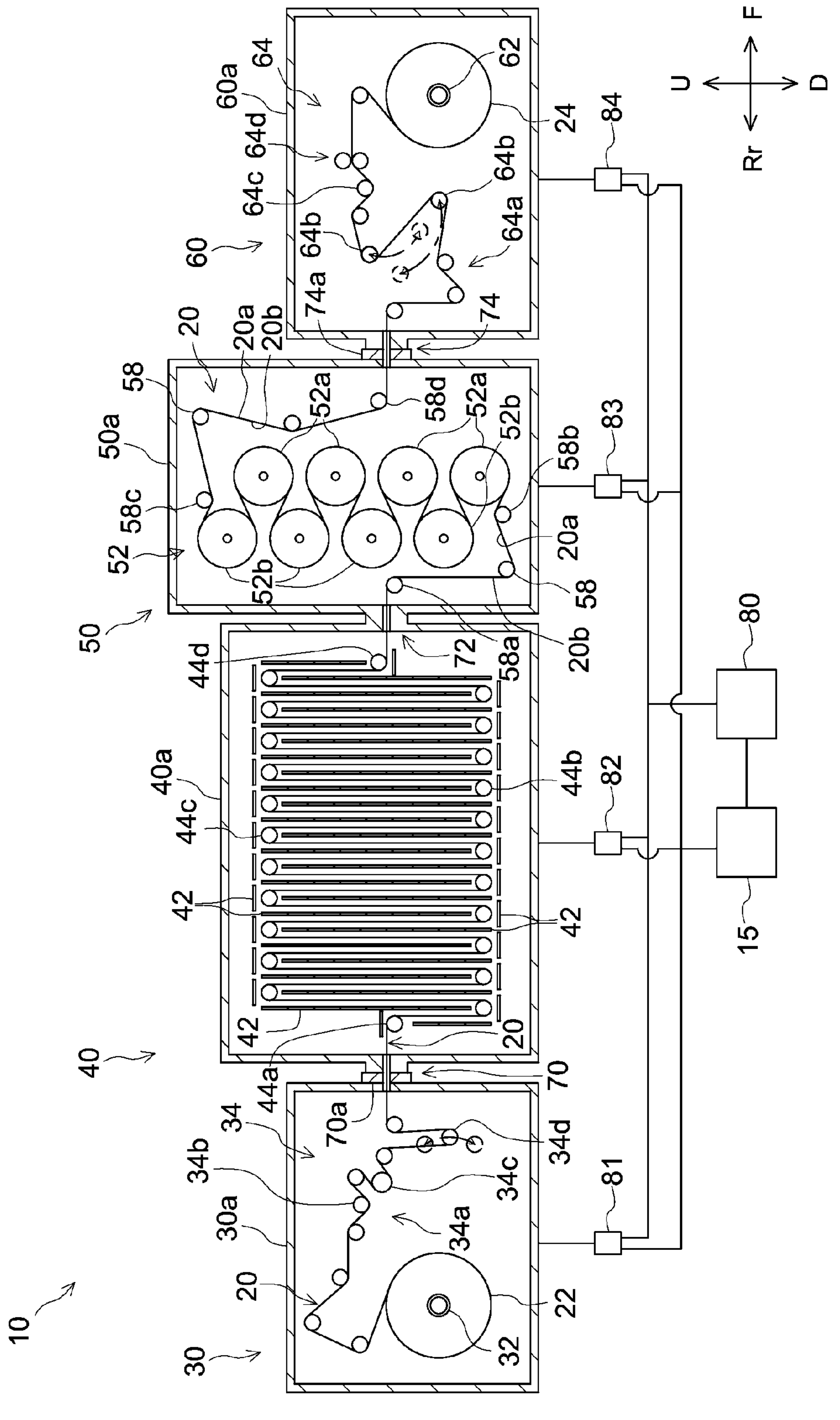
FIG. 1 is a schematic view illustrating a heat treatment apparatus 10.

Hereinbelow, embodiments of the present disclosure will be described with reference to the drawings. Throughout the drawings, identical reference characters and descriptions are used to designate like elements or features. It should be noted that dimensional relationships (length, width, thickness, and the like) in the drawings do not necessarily reflect actual dimensional relationships. Directions “up”, “down”, “left”, “right”, “front”, and “rear” are indicated respectively by arrows U, D, L R, F and Rr in the drawings. It should be noted that the directions and orientations referred to herein, such as up, down, right, left, front, and rear, are provided merely for convenience in description, and do not limit the present disclosure unless specifically stated otherwise.

Heat Treatment Apparatus 10

FIG. 1 is a schematic view illustrating a heat treatment apparatus 10. The heat treatment apparatus 10 is equipment for heat treating a strip-shaped workpiece material (hereinafter also referred to as “sheet”). In this embodiment, the heat treatment apparatus 10 is an apparatus for drying the strip-shaped workpiece material continuously while transferring the workpiece material in what is called a roll-to-roll method. As illustrated in FIG. 1, the heat treatment apparatus 10 includes a feed roll unit 30, a heat treating unit 40, a cooling unit 50, and a take-up unit 60 in that order. A sheet 20 is unwound out of a feed roll 22 provided in the feed roll unit 30, heat-treated in the heat treating unit 40, cooled in the cooling unit 50, and thereafter wound onto a take-up roll 24 provided in the take-up unit 60. Herein, the sheet 20 may be an electrode sheet for secondary batteries, in which an electrode material is coated on each of two surfaces (a first surface **20*a* and a second surface 20*b***) of a strip-shaped sheet substrate.

In this embodiment, each of the feed roll unit 30, the heat treating unit 40, the cooling unit 50, and the take-up unit 60 includes a space that is isolated from the external space. Each of the units is connected to a vacuum pump 80. The vacuum pump 80 depressurizes the interiors of the feed roll unit 30, the heat treating unit 40, the cooling unit 50, and the take-up unit 60. Herein, the sheet 20 is treated under a predetermined vacuum atmosphere that is lower than the atmospheric pressure. Note that the connecting structure of the vacuum pump 80 is not limited to such an embodiment. For example, it is possible that the interiors of the feed roll unit 30, the heat treating unit 40, the cooling unit 50, and the take-up unit 60 may be depressurized by a plurality of vacuum pumps 80. For example, it is also possible that a plurality of vacuum pumps 80 may be connected respectively to the feed roll unit 30, the heat treating unit 40, the cooling unit 50, and the take-up unit 60.

The piping of the vacuum pump 80 may be provided with vacuum valves 81 to 84 for adjusting the degree of vacuum of each of the units. The vacuum valves 81 to 84 are configured to be able to switch between connection of the vacuum pump 80 to each of the units and disconnection of the vacuum pump 80 from each of the units. When the degree of vacuum of each of the units does not need to be adjusted, it is possible to use open/close valves in place of the vacuum valves 81 to 84.

Feed Roll Unit 30

The feed roll unit 30 accommodates the feed roll 22 that has been wrapped with a strip-shaped sheet 20 before heat treatment. The feed roll unit 30 includes an outer wall 30*a* that encloses the internal equipment and the feed roll 22. The feed roll unit 30 is provided therein with a first shaft 32 and a plurality of rollers 34. The first shaft 32 is a shaft to which the feed roll 22 wrapped with the strip-shaped sheet 20 before heat treatment is attached. In this embodiment, the first shaft 32 is driven and rotated so that the strip-shaped sheet 20 is unwound out of the feed roll 22 attached to the first shaft 32

The space of the feed roll unit 30 that is enclosed by the outer wall 30*a* is provided with a plurality of rollers 34 that define the transfer path of the sheet 20. The sheet 20 that is unwound out of the feed roll 22 attached to the first shaft 32 is wrapped over the plurality of rollers 34 in a predetermined order and is transferred toward the heat treating unit 40. The plurality of rollers 34 include guide rollers 34*a*, a tension detecting roller 34*b*, a feed roller 34*c*, and a dancer roller 34*d*. The tension detecting roller 34*b* is a roller 34 for detecting the tension that acts on the sheet 20. A tension detector, not shown in the drawings, is attached to the tension detecting roller 34*b*. The dancer roller 34*d* is configured to be movable within a predetermined region. The dancer roller 34*d* moves to thereby adjust the tension of the sheet 20. The feed roller 34*c* is driven and rotated by a drive device, not shown in the drawings. By controlling rotation of the feed roller 34*c*, the position of the dancer roller 34*d* is adjusted.

Heat Treating Unit 40

The heat treating unit 40 is a unit that heat-treats the strip-shaped sheet 20 while transferring the strip-shaped sheet 20. The heat treating unit 40 heat-treats the strip-shaped sheet 20 that has been unwound out of the feed roll 22 attached to the first shaft 32 while transferring the strip-shaped sheet 20. It should be noted that although this embodiment depicts an embodiment in which the heat treatment apparatus 10 is provided with only one heat treating unit 40, such an embodiment is merely illustrative. It is also possible that the heat treatment apparatus 10 may include a plurality of heat treating units 40.

In this embodiment, the heat treating unit 40 includes a heater 42, guide rollers 44*a* to 44*d*, and an outer wall 40*a*. The outer wall 40*a* encloses the space in which the heater 42 and the guide rollers 44*a* to 44*d* are disposed. A connecting part 70 is provided on the outer wall 30*a* of the feed roll unit 30 and the outer wall 40*a* of the heat treating unit 40. The connecting part 70 is provided with an outlet for the feed roll unit 30 and an inlet for the heat treating unit 40. The heat treating unit 40 is connected to the feed roll unit 30 via the connecting part 70. A passage that allows the strip-shaped sheet 20 to pass through is formed in the connecting part 70. The sheet 20 is transferred from the feed roll unit 30 to the heat treating unit 40 through the connecting part 70. The dimensions of the passage for the sheet 20, which is formed in the connecting part 70, are not particularly limited. In this embodiment, the passage for the sheet 20 is set to have dimensions that are slightly greater than the width and the thickness of the sheet 20. As a result, the atmosphere in the heat treating unit 40 and the atmosphere in the feed roll unit 30 are unlikely to interfere with each other. The inlet to the heat treating unit 40 (in the connecting part 70 in this embodiment) is provided with a door 70*a*. The door 70*a* is closed when, for example, the feed roll 22 is replaced. For example, such as when the feed roll 22 is replaced, the atmosphere in the heat treating unit 40 is maintained because the door 70*a* is closed, so that recovery of the apparatus is made more quickly when the feed roll 22 is replaced. It is also possible that the door 70*a* may be closed during the time when the sheet 20 is passing through the connecting part 70, for example, such as when the feed roll 22 is replaced. When the remaining amount of the sheet 20 wound on the feed roll 22 becomes small, the feed roll 22 is replaced with a new one. By connecting an end portion of one feed roll 22 after the replacement to an end portion of the other feed roll 22 before the replacement, the atmosphere in the heat treating unit 40 can be maintained, so that recovery of the apparatus can be made more quickly when the feed roll 22 is replaced.

Guide Rollers 44*a* to 44*d*

The guide rollers 44*a* to 44*d* are rollers for setting a transfer path in which the sheet 20 is transferred in the heat treating unit 40. In this embodiment, each of the guide rollers 44*a* to 44*d* is a cylindrical roller. Each axis of the guide rollers 44*a* to 44*d* is oriented in a lateral direction. The guide roller 44*a* is disposed near the inlet (the connecting part 70) of the heat treating unit 40. A plurality of guide rollers 44*b* are arranged sequentially along the front-to-rear direction at a predetermined pitch in a lower portion of the heat treating unit 40. A plurality of guide rollers 44*c* are arranged from the inlet toward the outlet of the heat treating unit 40 in an upper portion of the heat treating unit 40 so as to be staggered by half a pitch from the plurality of guide rollers 44*b*. The guide roller 44*d* is disposed near the outlet (connecting part 72) of the heat treating unit 40. The sheet 20 is placed over the guide roller 44*a*, which is near the inlet of the heat treating unit 40, and is transferred downward. Thereafter, the sheet 20 is wrapped over the upper and lower guide rollers 44*b* and 44*c* alternately and sequentially from the rear to the front. This allows the sheet 20 to travel from the inlet toward the outlet in the heat treating unit 40 with it proceeding upward and downward alternately. Then, the sheet 20 is sent out toward the cooling unit 50 via the guide roller 44*d*, which is disposed near the outlet.

Heater 42

The heater 42 is equipment for heating the sheet 20. In this embodiment, the heater 42 is disposed around the sheet 20, which is placed over the guide rollers 44*a* to 44*d* and travels from the inlet toward the outlet with the sheet 20 proceeding upward and downward alternately, so that the heater 42 faces the sheet 20. The heater 42 is disposed between the gap spaces of the sheet 20, which is placed over the guide rollers 44*a* to 44*d* and proceeds upward and downward alternately, and around the sheet 20 that is transferred, so as to face the sheet 20. The heater 42 may be fixed by, for example, a heater holder and support posts. It is possible that the support posts for fixing the heater holder may be arranged upright from the bottom wall of the outer wall 40*a* and the heater holder may be fixed to the support posts, to fix the heater 42 to the heater holder. The heater 42 may also be supported, for example, on a side wall of the outer wall 40*a*.

This embodiment employs a far-infrared heating type plate heater as the heater 42. It is also possible to use various types of heaters as the heater 42 according to the heating temperature, the heating atmosphere, and the like. It is also possible that, for example, a cylindrical-shaped heater may be used as the heater 42, in place of the plate heater. The material of the heater 42 is not particularly limited, and it is possible to use a metal sheath heater, a ceramic heater, a lamp heater, or the like. The heater 42 is not limited to an far-infrared heating type heater. In cases of atmosphere furnace, it is also possible to use a hot-air heating type heater or an infrared heating type lamp heater as the heater 42.

The arrangement of the guide rollers 44*a* to 44*d* such as described above serves to increase the distance along which the sheet 20 is transferred in the heat treating unit 40. As a result, the sheet 20 can be dried efficiently. Moreover, the heat from the heater 42 is applied to both the first surface 20*a* and the second surface 20*b* of the sheet 20 in a like manner. Therefore, the heating conditions for the first surface 20*a* and the second surface 20*b* may become close. This may reduce the difference in thermal history between the first surface 20*a* and the second surface 20*b* of the sheet 20. The thermal history means the history in which the sheet 20 has been heated and cooled. By matching heating conditions and cooling conditions within the sheet 20, the difference in thermal history within the sheet 20 can be reduced.

The arrangement of the heater 42 and the guide rollers 44*a* to 44*d* is not limited to such an embodiment. The arrangement of the heater 42 and the guide rollers 44*a* to 44*d* may be set as appropriate depending on various conditions, such as the type of sheet 20, conditions of heat treatment, and the like. For example, when different materials are formed respectively on the first surface 20*a* and the second surface 20*b* of the sheet 20, the arrangement and output power of the heater 42 may be set so that the first surface 20*a* and the second surface 20*b* can be heated under different conditions.

Cooling Unit 50

The cooling unit 50 is a unit that cools the strip-shaped sheet 20 that has been heat-treated in the heat treating unit 40 while transferring the strip-shaped sheet 20. The cooling unit 50 includes a cooling roller 52, a plurality of guide rollers 58, and an outer wall 50*a*. In this embodiment, the cooling unit 50 includes a plurality of cooling rollers 52. The outer wall 50*a* encloses the space in which the plurality of cooling rollers 52 and the plurality of guide rollers 58 are disposed. The outer wall 50*a* is formed with an inlet through which the sheet 20 is brought in and an outlet through which the sheet 20 sent out.

The plurality of cooling rollers 52 and the plurality of guide rollers 58 set a transfer path in which the sheet 20 is transferred in the cooling unit 50. The cooling unit 50 is connected to the heat treating unit 40 via the connecting part 72. The sheet 20 is transferred from the heat treating unit 40 to the cooling unit 50 through the connecting part 72. Although not limited thereto, the passage for the sheet 20 in the connecting part 72 is set to have dimensions that are slightly greater than the width and the thickness of the sheet 20, as in the connecting part 70. As a result, the atmosphere in the heat treating unit 40 and the atmosphere in the cooling unit 50 are unlikely to interfere with each other. Although it is possible that a single cooling roller 52 may be provided, it is more preferable that a plurality of cooling rollers 52 be provided.

Cooling Roller 52

The cooling roller 52 is a roller configured to allow a refrigerant to flow through an inside thereof. In this embodiment, the cooling roller 52 includes at least one first cooling roller 52*a* and at least one second cooling roller 52*b*. Herein, the first cooling roller 52*a* is a cooling roller 52 around which the strip-shaped sheet 20 is wrapped so as to be in contact with the first surface 20*a* of the strip-shaped sheet 20. The second cooling roller 52*b* is a cooling roller 52 around which the strip-shaped sheet 20 is wrapped so as to be in contact with the second surface 20*b* of the strip-shaped sheet 20. In this embodiment, the cooling roller 52 is connected to a drive device, not shown in the drawings. The cooling roller 52 rotates along the transfer direction according to a preset transfer speed.

In this embodiment, a plurality of first cooling rollers 52*a* and a plurality of second cooling rollers 52*b* (four each in this embodiment) are provided. The number of cooling rollers 52 is not particularly limited. For example, the first cooling roller 52*a* and the second cooling roller 52*b* may be provided one each.

In this embodiment, the plurality of first cooling rollers 52*a* are arranged in a row along the height direction at a predetermined pitch in a front portion (toward the outlet) of the cooling unit 50. The plurality of second cooling rollers 52*b* are arranged in a row along the height direction at a predetermined pitch in a rear portion (toward the inlet) of the cooling unit 50. The interval between adjacent ones of the first cooling rollers 52*a* and the interval between adjacent ones of the second cooling roller 52*b* are each set to be less than the outer diameter of the cooling rollers 52. Note that the arrangement of the first cooling rollers 52*a* and the second cooling rollers 52*b* is not limited to any particular arrangement. For example, the plurality of first cooling rollers 52*a* and the plurality of second cooling rollers 52*b* may each be arranged from the inlet end toward the outlet end of the cooling unit 50. The plurality of first cooling rollers 52*a* may be arranged in a row at a predetermined pitch in an upper portion of the cooling unit 50. The plurality of second cooling rollers 52*b* may be arranged in a row at a predetermined pitch in a lower portion of the cooling unit 50. It is also possible that the interval between adjacent ones of the first cooling rollers 52*a* and the interval between adjacent ones of the second cooling roller 52*b* may each be set to be greater than the outer diameter of the cooling rollers 52.

In this embodiment, the first cooling rollers 52*a* and the second cooling rollers 52*b* are arranged at the same pitch. The second cooling rollers 52*b* are arranged so that the height of each of them is set to be half a pitch higher than that of the first cooling rollers 52*a* in sequence from below. This allows the plurality of first cooling rollers 52*a* and the plurality of second cooling rollers 52*b* to be arranged so as to be staggered in height sequentially from the front to the rear of the cooling unit 50. In other words, the plurality of first cooling rollers 52*a* and the plurality of second cooling rollers 52*b* are arranged in a staggered manner. Because the first cooling rollers 52*a* and the second cooling rollers 52*b* are arranged in this manner, the cooling roller 52 is allowed to have a structure elongated in a height direction. On the other hand, the area occupied by the cooling unit 50 can be reduced, so that space savings of the equipment can be achieved.

Guide Rollers 58

The plurality of guide rollers 58 are rollers that guide the strip-shaped sheet 20. In this embodiment, each of the guide rollers 58 is a cylindrical roller. Each axis of the guide rollers 58 is oriented in a lateral direction in the cooling unit 50 and is provided in the cooling unit 50. The transfer path for the strip-shaped sheet 20 is set by the plurality of guide rollers 58 so that the strip-shaped sheet 20 is passed from the inlet (connecting part 72) through the plurality of cooling rollers 52, and is directed from the plurality of cooling rollers 52 toward the outlet (connecting part 74) in the cooling unit 50. Note that the plurality of guide rollers 58 include a tension detecting roller that detects the tension that acts on the sheet 20.

Among the plurality of guide rollers 58 provided in the cooling unit 50, a guide roller 58*a* is disposed near the inlet of the cooling unit 50. Some of the plurality of guide rollers 58 are disposed upstream of the plurality of cooling rollers 52 so that the transfer path is set downward from the guide roller 58*a*. A guide roller 58*b* is disposed upstream of the lowermost one of the first cooling rollers 52*a*. A guide roller 58*c* is disposed downstream of the uppermost one of the second cooling rollers 52*b*. A guide roller 58*d* is disposed near the outlet of the cooling unit 50. In addition, some of the plurality of guide rollers 58 are disposed so that the transfer path is set from the guide roller 58*c* toward the guide roller 58*d* disposed at the outlet of the cooling unit 50.

As illustrated in FIG. 1, the strip-shaped sheet 20 is introduced into the cooling unit 50 through the guide roller 58*a* from the inlet of the cooling unit 50 and is transferred downward on an upstream side of the plurality of cooling rollers 52. The strip-shaped sheet 20 is transferred through the guide roller 58*b* to the lowermost one of the first cooling rollers 52*a*. The strip-shaped sheet 20 is wrapped over the first cooling rollers 52*a* and the second cooling rollers 52*b* alternately in order from the bottom, and is transferred from the uppermost one of the second cooling rollers 52*b* toward the guide roller 58*c*. The strip-shaped sheet 20 is transferred downward through the guide roller 58*c* and transferred through the guide roller 58*d* from the outlet of the cooling unit 50 to the take-up unit 60. In this case, the strip-shaped sheet 20 is wrapped so that the first surface 20*a* of the strip-shaped sheet 20 comes into contact with the first cooling rollers 52*a* and the second surface 20*b* of the strip-shaped sheet 20 comes into contact with the second cooling rollers 52*b*. This enables the first surface 20*a* and the second surface 20*b* of the strip-shaped sheet 20 to be cooled sequentially by the cooling rollers 52. This reduces the difference in thermal history between the first surface 20*a* and the second surface 20*b* of the strip-shaped sheet 20.

Moreover, in this embodiment, the guide roller 58*b* adjusts the angle at which the strip-shaped sheet 20 comes into contact with the most upstream one of the cooling rollers 52. The upper end of the guide roller 58*b* is disposed at a position higher than the lower end of the lowermost one of the first cooling rollers 52*a*. This increases the length of the strip-shaped sheet 20 that is wrapped on the lowermost one of the first cooling rollers 52*a* and thus allows the strip-shaped sheet 20 to be cooled more easily. The guide roller 58*c* adjusts the angle at which the strip-shaped sheet 20 comes into contact with the most downstream one of the cooling rollers 52. In this embodiment, the lower end of the guide roller 58*c* is disposed at a position lower than the upper end of the uppermost one of the second cooling rollers 52*b*. This increases the length of the strip-shaped sheet 20 that is wrapped on the uppermost one of the second cooling rollers 52*b* and thus allows the strip-shaped sheet 20 to be cooled more easily. In this embodiment, the sheet 20 is in contact with each of the first cooling roller 52*a* and the second cooling roller 52*b* circumferentially over an angle of 180 degrees or greater.

In this embodiment, the positions of the guide rollers 58*b* and 58*c* are set so that the angle at which the strip-shaped sheet 20 comes into contact with the most upstream one of the cooling rollers 52 and the angle at which the strip-shaped sheet 20 comes into contact with the most downstream one of the cooling rollers 52 are equal. As a result, the length of the strip-shaped sheet 20 that is wrapped on the lowermost one of the first cooling rollers 52*a* and the length of the strip-shaped sheet 20 that is wrapped on the uppermost one of the second cooling rollers 52*b* are made equal to each other. This causes the difference in thermal history between the first surface 20*a* and the second surface 20*b* of the strip-shaped sheet 20 to reduce.

The sheet 20 that has been cooled in the cooling unit 50 is transferred toward the take-up unit 60. In this embodiment, the outlet of the cooling unit 50 (the connecting part 74 in this embodiment) is provided with a door 74*a*. As with the door 70*a*, the door 74*a* is closed during the time when the sheet 20 is not passing through the connecting part 74, for example, such as when the take-up roll 24 is replaced. For example, such as when the take-up roll 24 is replaced, the atmosphere in the cooling unit 50 is maintained because the door 74*a* is closed, so that recovery of the apparatus is made more quickly when the take-up roll 24 is replaced. It is also possible that the door 74*a* may be closed during the time when the sheet 20 is passing through the connecting part 74, for example, such as when the take-up roll 24 is replaced. When the amount of the sheet 20 wound on the take-up roll 24 becomes large, the take-up roll 24 is replaced with a new one. By connecting an end portion of the sheet 20 to the take-up roll 24 after the replacement, the atmosphere in the heat treating unit 40 can be maintained, so that recovery of the apparatus can be made more quickly when the take-up roll 24 is replaced.

Take-up Unit 60

The take-up unit 60 accommodates the take-up roll 24 for winding the sheet 20 that has been cooled by the cooling rollers 52. The take-up unit 60 includes an outer wall 60*a* that encloses the internal equipment. A connecting part 74 is provided on the outer wall 60*a* of the take-up unit 60 and the outer wall 50*a* of the cooling unit 50. The take-up unit 60 is connected to the cooling unit 50 via the connecting part 74. The sheet 20 is transferred to the take-up unit 60 through the connecting part 74. Although not limited thereto, the passage for the sheet 20 in the connecting part 74 is set to have dimensions such that the atmosphere in the cooling unit 50 and that in the take-up unit 60 are unlikely to interfere with each other, as with the connecting parts 70 and 72.

The take-up unit 60 is provided with a second shaft 62 and a plurality of rollers 64. The take-up roll 24 that has been heat-treated in the heat treating unit 40 and cooled in the cooling unit 50 is attached to the second shaft 62. The second shaft 62 is driven and rotated so that the sheet 20 is wound up on the take-up roll 24.

The plurality of rollers 64 set a transfer path in which the sheet 20 is transferred in the take-up unit 60. The sheet 20 transferred from the cooling unit 50 is placed on one of the rollers 64 that is near the inlet (connecting part 74) of the take-up unit 60, is thereafter wrapped over a plurality of rollers 64 in a predetermined order, and is wound up on the take-up roll 24. The plurality of rollers 64 include guide rollers 64*a*, rollers 64*b*, a tension detecting roller 64*c*, and feed rollers 64*d*. The rollers 64*b* are configured to be movable within a predetermined region. The rollers 64*b* may be moved to ensure a necessary extra length of the sheet 20, for example, when the take-up roll 24 is replaced. A tension detector, not shown in the drawings, is attached to the tension detecting roller 64*c*. The feed rollers 64*d* send out an extra length necessary for affixing the sheet 20 to the take-up roll 24 having been replaced when replacing the take-up roll 24.

Drive Devices 32*a* and 62*a*

Figure 2:
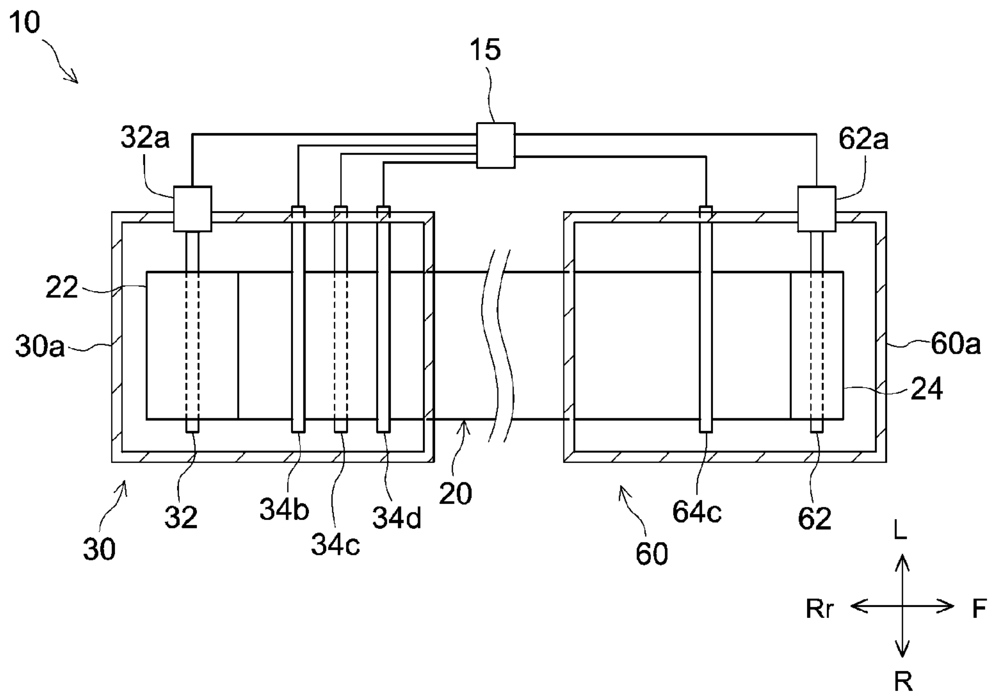
FIG. 2 is a schematic view illustrating a drive mechanism for a sheet 20.

Drive devices 32*a* and 62*a* (see FIG. 2) drive and rotate the first shaft 32, to which the feed roll 22 is attached, and the second shaft 62, to which the take-up roll 24 is attached. This embodiment employs a motor as the drive device 32*a*. FIG. 2 is a schematic view illustrating a drive mechanism for the sheet 20. FIG. 2 does not depict the heat treating unit 40 and the cooling unit 50, which are disposed between the feed roll unit 30 and the take-up unit 60. Also, FIG. 2 does not depict rollers 34 in the feed roll unit 30 other than the tension detecting roller 34*b*, the feed roller 34*c*, and the dancer roller 34*d*. Likewise, FIG. 2 does not depict rollers 64 in the take-up unit 60 other than the tension detecting roller 64*c*.

As illustrated in FIG. 2, the drive devices 32*a* and 62*a* are attached respectively to one outer wall 30*a* of the feed roll unit 30 and to one outer wall 60*a* of the take-up unit 60. The first shaft 32 is connected to the drive device 32*a*. The first shaft 32 is driven and rotated by the drive device 32*a* so that the sheet 20 is unwound from the feed roll 22. The second shaft 62 is connected to the drive device 62*a*. The second shaft 62 is driven and rotated by the drive device 62*a* so that the sheet 20 is wound up on the take-up roll 24. It is also possible that the drive devices 32*a* and 62*a* may be installed in an atmosphere box provided in a space surrounded by the outer wall 30*a* and the outer wall 60*a*.

Control Device 15

A control device 15 controls the transfer speed of the sheet 20 and the tension that acts on the sheet 20 so that the sheet 20 can be transferred according to predetermined treatment conditions. In this embodiment, the control device 15 controls the feed tension at the time of unwinding the sheet 20, the in-furnace tension applied to the sheet 20 that is being treated, and the take-up tension at the time of taking up the treated sheet 20. The control device 15 is connected to the drive devices 32*a* and 62*a*. The control device 15 is also connected to the tension detecting roller 34*b*, the feed roller 34*c*, the dancer roller 34*d*, the tension detecting roller 64*c*, and the like. The control device 15 feeds back the feed tension detected by the tension detecting roller 34*b* to the drive device 32*a* to control the torque of the first shaft 32. As a result, the feed tension is adjusted. The control device 15 also feeds back, to the dancer roller 34*d* the in-furnace tension detected by the tension detecting roller on which the sheet 20 being treated is wrapped (the tension detecting roller provided in the cooling unit 50 (see FIG. 1) in this embodiment). The dancer roller 34*d* moves according to the detected in-furnace tension. As a result, the in-furnace tension is adjusted. Additionally, the rotation speed of the feed roller 34*c* is adjusted so that the position of the dancer roller 34*d* returns to the reference position with the in-furnace tension being constant. In addition, the control device 15 feeds back the take-up tension detected by the tension detecting roller 64*c* to the drive device 62*a* to control the torque of the second shaft 62. As a result, the take-up tension is adjusted.

The control device 15 may be configured to be able to control various treatment conditions in addition to the transfer speed and tension of the sheet 20. The control device 15 may be configured to, for example, be able to control each of the atmospheres in the feed roll unit 30, the heat treating unit 40, the cooling unit 50, and the take-up unit 60 (see FIG. 1).

As illustrated in FIG. 1, the control device 15 (see FIG. 2) is connected to the vacuum pump 80 and the vacuum valves 81 to 84 so as to be able to adjust the degree of vacuum of each of the units. The control device 15 may be connected to a vacuum degree detector, not shown in the drawings, for detecting the degree of vacuum of each of the units. When the sheet 20 is treated by the heat treatment apparatus 10, the vacuum valves 81 to 84 are opened. When the degree of vacuum of each of the units does not need to be adjusted, it is possible to use open/close valves in place of the vacuum valves 81 to 84. During a normal operation, the doors 70*a* and 74*a* are open, and each of the units has the same degree of vacuum.

When a roll is to be replaced, the control device 15 controls each of the vacuum valves 81 to 84 to open/close to thereby switch the degree of vacuum of each of the units. When the feed roll 22 is to be replaced, the vacuum valve 81 is closed with the door 70*a* being closed. When the take-up roll 24 is to be replaced, the vacuum valve 84 is closed with the door 74*a* being closed. When a roll is to be replaced, the chamber in which the roll is to be replaced is released to the atmosphere by an atmospheric relief valve, not shown in the drawings. It is also possible that the atmospheric relief valve may also be provided for the heat treating unit 40 and the cooling unit 50. The control device 15 may control the opening and closing of the vacuum valves 81 to 84 and the atmospheric relief valves. Note that, when the heat treatment apparatus 10 is an atmosphere furnace that heat-treats the sheet 20 with a predetermined atmosphere, the control device 15 may be connected to a gas supply device that supplies an atmosphere gas in order to adjust the atmosphere inside the heat treatment apparatus 10.

The sheet 20 is treated while being transferred in the heat treatment apparatus 10. In this embodiment, the sheet 20 is dried by being heat-treated continuously in the heat treating unit 40.

The present inventors have investigated ways to transfer the strip-shaped sheet 20 at high speed in order to improve the treatment efficiency for the sheet 20. Increasing the transfer speed of the sheet 20 enables a greater amount of sheet 20 to be treated per unit time and to improve the treatment efficiency for the sheet 20. The transfer speed of the sheet 20 may be, but is not particularly required to be, set to about 10 m/min. to about 200 m/min. In this embodiment, the transfer speed of the sheet 20 is set to about 100 m/min.

When, for example, the transfer speed of the sheet is low, the temperature of the sheet can be lowered sufficiently before the sheet is wound onto the take-up roll. However, when the transfer speed of the sheet is high, the sheet may not be cooled sufficiently, so the heat-treated sheet may be wound onto the take-up roll with the sheet still being at high temperature. According to a study conducted by the present inventors, when the sheet is wound onto the take-up roll with it being high temperature, the length of time until the sheet is cooled is likely to vary within the sheet. For example, when the sheet is wound up on the take-up roll with the temperature of the sheet being high, the closer the sheet is to the core of the take-up roll, the more the heat is difficult to dissipate from the sheet. This means that the closer the sheet is to the core of the take-up roll, the longer time the sheet is kept at high temperature for. This may cause differences in thermal history within the sheet. The differences in thermal history within the sheet may lead to variations in performance of the sheet. In addition, the sheet may expand and contract due to changes in temperature. However, in the case where the sheet has already wound on the take-up roll, the sheet does not contract easily in a longitudinal direction (i.e., in a circumferential direction of the take-up roll) when the sheet is cooled after having been wound up. In such a case, stress may act on the sheet such as to contract the sheet in a longitudinal direction. As a consequence, there is a concern that the sheet may undergo deformation. Moreover, when it is attempted to taken out the sheet with it still being high temperature, the sheet may undergo oxidization in taking out the sheet. Furthermore, it takes a long time to cool the sheet under vacuum. From the viewpoint of safety too, it is preferable that the sheet has been cooled sufficiently in taking out the sheet.

In the foregoing embodiment, the heat treatment apparatus 10 includes the heating treatment unit 40 that heat-treats a strip-shaped sheet 20 while transferring the strip-shaped sheet 20, and the cooling unit 50 that cools the strip-shaped sheet 20 having been heat-treated in the heating treatment unit 40 while transferring the strip-shaped sheet 20. The cooling unit 50 includes a cooling roller 52 that allows a refrigerant to flow through an interior thereof, and an outer wall 52*a* that surrounds a space in which the cooling roller 52 is disposed. The sheet 20 that has been heat-treated in the heat treating unit 40 is cooled by the cooling roller 52 in the cooling unit 50. As a result, the sheet 20 may be wound up on the take-up roll 24 with the sheet 20 being sufficiently cooled. Therefore, it is unlikely to cause problems such as expansion and contraction of the sheet 20 due to changes in temperature even when the transfer speed of the sheet 20 is increased in order to improve the treatment efficiency for the sheet 20. Thus, because the sheet 20 is sufficiently cooled, it is possible to reduce problems that may occur when the transfer speed is increased. As a result, the treatment efficiency for the sheet 20 is easily improved.

In the foregoing embodiment, the heat treatment apparatus 20 further includes the take-up unit 60 in which the strip-shaped sheet 20 having been cooled in the cooling unit 50 is wound. Herein, the cooling unit 50 including the cooling rollers 52 is disposed between the heat treating unit 40, which heat-treats the sheet 20, and the take-up unit 60, which wounds the heat-treated sheet 20. Because the cooling unit 50 has a space surrounded by the outer wall 50*a*, it is unlikely to be affected by the atmospheres in the heat treating unit 40 and the take-up unit 60. This serves to stabilize the atmosphere such as the temperature inside the cooling unit 50 and the temperature of the cooling rollers 52. For this reason, the sheet 20 can be treated efficiently under stable conditions. For example, it is easier to uniformize the thermal history of the sheet 20 even when the transfer speed of the sheet 20 is increased in order to improve the treatment efficiency for the sheet 20.

In the foregoing embodiment, the heat treating unit 40 includes the outer wall 40*a* surrounding a space in which the strip-shaped sheet 20 is heat-treated. The heat treating unit 40 is provided with the door 70*a*, which is disposed at the inlet thereof and is configured to switch the atmosphere in the heat treating unit 40 and the atmosphere in a space upstream of the heat treating unit 40 from one to the other. The cooling unit 50 is provided with the door 74*a*, which is disposed at the outlet thereof and is configured to switch the atmosphere in the cooling unit 50 and the atmosphere in a space downstream of the cooling unit 50 from one to the other. Such a configuration enables the heat treating unit 40 and the cooling unit 50 to switch the atmospheres for the space in which the first shaft 32 and the second shaft 62 are provided (i.e., the feed roll unit 30 and the take-up unit 60 in this embodiment). For example, when the feed roll 22 or the take-up roll 24 is to be replaced, the door 70*a* and the door 74*a* are closed so that the replacement can be performed while maintaining the atmospheres in the heat treating unit 40 and the cooling unit 50. At that time, the heat treating unit 40 and the cooling unit 50 are allowed to maintain the atmospheres in treating the sheet 20. This may reduce the time required until the atmosphere in the heat treatment apparatus 10 will be able to treat the sheet 20. For example, after a roll is replaced, it is only necessary to wait until the atmospheres in the feed roll unit 30 and the take-up unit 60 are ready to treat the sheet 20, to resume the treatment for the sheet 20. The length of time required until the heat treatment for the sheet 20 becomes possible after replacing a roll is reduced, so that the treatment efficiency for the sheet 20 is improved.

Although it is possible that a single cooling roller may be provided, it is more preferable that a plurality of cooling rollers be provided. When the cooling unit 50 includes a plurality of cooling rollers 52, the cooling efficiency is further improved, and the treatment efficiency for the sheet 20 may be further improved.

In this case, the plurality of cooling rollers 52 includes at least one first cooling roller 52*a* around which the strip-shaped sheet 20 is wrapped so as to be in contact with the first surface 20*a* of the strip-shaped sheet 20, and at least one second cooling rollers 52*b* around which the strip-shaped sheet 20 is wrapped so as to be in contact with the second surface 20*b* of the strip-shaped sheet 20. Because the sheet 20 is wrapped over a plurality of cooling rollers 52, the sheet 20 is more likely to be cooled sufficiently before being wound up on the take-up roll 24. For this reason, temperature variations in the sheet 20 after having been wound are reduced. This reduces variations in thermal history within the sheet 20 and deformation of the sheet 20. As a result, the treatment efficiency for the sheet 20 can be improved while maintaining the product quality, for example, even when the transfer speed of the sheet 20 is increased. Moreover, in the foregoing embodiment, the first surface 20*a* of the sheet 20 is cooled by the first cooling rollers 52*a* while the second surface 20*b* thereof is cooled by the second cooling rollers 52*b*. Because both the first surface 20*a* and the second surface 20*b* of the sheet 20 are cooled, temperature variations across the thickness of the sheet 20 are reduced. As a result, it is possible to reduce differences in thermal history between the first surface 20*a* and the second surface 20*b* of the sheet 20.

In the foregoing embodiment, the at least one first cooling roller 52*a* and the at least one second cooling roller 52*b* each include a plurality of cooling rollers. Therefore, the cooling efficiency for the sheet 20 is good. In addition, the sheet 20 is wrapped onto the first cooling rollers 52*a* and the second cooling rollers 52*b* alternately. Such a configuration allows the first surface 20*a* and the second surface 20*b* of the sheet 20 to be cooled alternately. This allows the first surface 20*a* and the second surface 20*b* to be cooled uniformly, and may reduce the difference in thermal history between the first surface 20*a* and the second surface 20*b*.

In the foregoing embodiment, the interval between adjacent ones of the first cooling rollers 52*a* and the interval between adjacent ones of the second cooling roller 52*b* are less than the outer diameter of the cooling rollers 52. Because the intervals between the cooling rollers 52 are set in this way, the length of the sheet 20 that is in contact with the cooling rollers 52 is increased along the circumferential direction. Herein, the sheet 20 is in contact with the cooling rollers 52 circumferentially over an angle of 180 degrees or greater. The sheet 20 may be more efficiently cooled because the distance over which the sheet 20 and the cooling rollers 52 are in contact is longer.

In the foregoing embodiment, the cooling unit 50 is connected to the vacuum pump 80. Likewise, the heat treating unit 40 is connected to the vacuum pump 80. This means that the sheet 20 is treated under a vacuum atmosphere. This improves the drying efficiency for the sheet 20.

In this embodiment, the cooling unit 50 and the take-up unit 60, which are downstream of the heat treating unit 40, are also in a vacuum atmosphere. In a vacuum atmosphere, the atmosphere gas around the sheet 20 is thin, so heat is difficult to be removed from the sheet 20 by the atmosphere. In other words, the sheet 20 is difficult to be cooled by convection. As a consequence, the cooling efficiency for the sheet 20 may be lowered under a vacuum atmosphere.

In the foregoing embodiment, the sheet 20 is transferred while being wrapped over the cooling rollers 52. In this case, because the sheet 20 is in contact with the cooling rollers 52, the heat of the sheet 20 is easily transferred to the cooling rollers 52 that are in contact with the sheet 20. Therefore, the heat treatment apparatus 10 equipped with the cooling rollers 52 shows good cooling efficiency for the sheet 20 even in a vacuum atmosphere. For example, the sheet 20 is more likely to be cooled before being wound on the take-up roll 24 even when the transfer speed of the sheet 20 is high.

Figure 3:
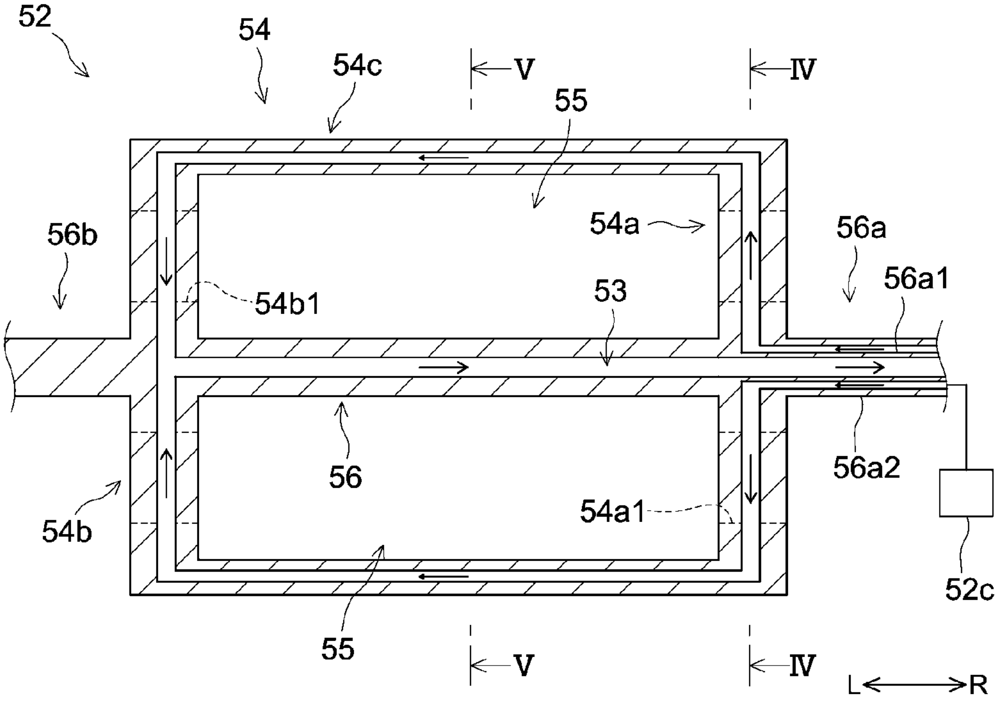
FIG. 3 is a cross-sectional view of a cooling roller 52.
Figure 4:
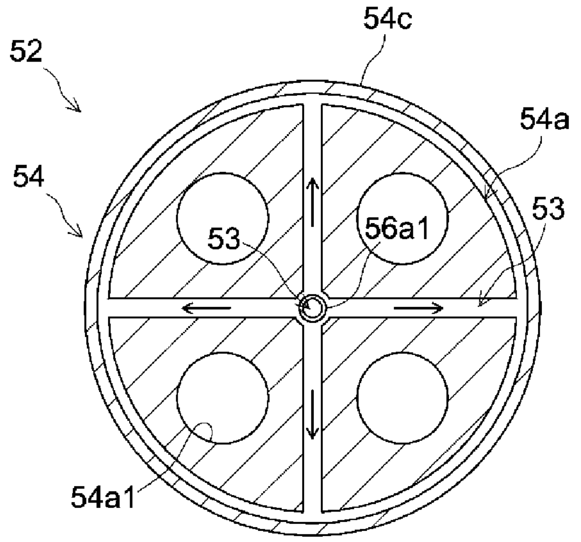
FIG. 4 is a cross-sectional view taken along line IV-IV in FIG. 3.
Figure 5:
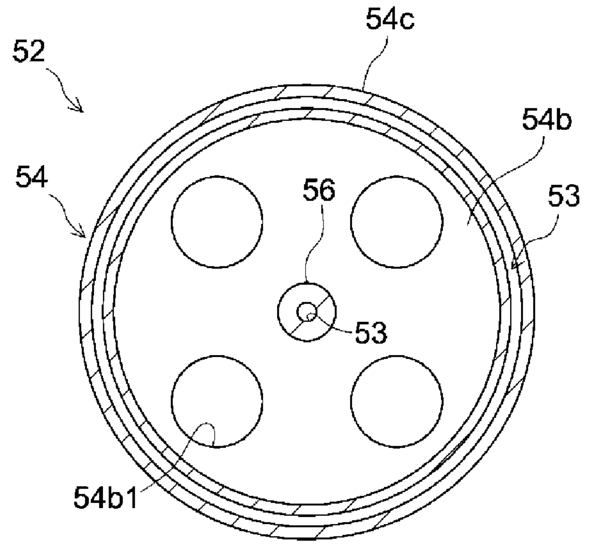
FIG. 5 is a cross-sectional view taken along line V-V in FIG. 3.

Hereinbelow, an example of cooling roller used in the heat treatment apparatus will be described with reference to the drawings. FIGS. 3 to 5 schematically illustrate an embodiment of the cooling roller 52 used for the heat treatment apparatus 10. FIG. 3 is a cross-sectional view of the cooling roller 52. FIG. 3 shows a cross section taken along the axis of the cooling roller 52. FIG. 4 is a cross-sectional view taken along line IV-IV in FIG. 3. FIG. 5 is a cross-sectional view taken along line V-V in FIG. 3. FIGS. 4 and 5 each show a cross section taken along a radial direction of the cooling roller 52. In FIGS. 3 and 4, the arrows indicate the directions in which the refrigerant is supplied.

As illustrated in FIG. 3, the cooling roller 52 includes a roller part 54 and a shaft part 56. The roller part 54 is a part around which the sheet 20 is wrapped so as to be in contact with the sheet 20. The outer diameter of the shaft part 56 is formed to be smaller than the outer diameter of the roller part 54. The shaft part 56 constitutes a rotary shaft of the cooling roller 52. The roller part 54 includes disk-shaped end portions 54*a* and 54*b*, and a tubular portion 54*c* supported by the end portions 54*a* and 54*b*. The shaft part 56 passes through the substantially center of the end portions 54*a* and 54*b* of the roller part 54. In this embodiment, a space 55 is formed radially between the shaft part 56 and the roller part 54 of the cooling roller 52. The end portions 54*a* and 54*b* respectively include a plurality of substantially circular holes 54*a*1 and 54*b*1 formed therein.

In this embodiment, the roller part 54 and the shaft part 56 are formed integrally with each other. The shaft part 56 spans between side walls of the outer wall 50*a* (see FIG. 1). Although not detailed in the drawings, the end portions 56*a* and 56*b* of the shaft part 56 is supported on the outer wall 50*a* via bearings.

The cooling roller 52 is configured to allow a refrigerant to flow through an inside thereof. Although not particularly limited thereto, it is possible to use water or the like as the refrigerant. The temperature of the refrigerant may be set as appropriate according to cooling conditions, and may be set to about 5° C. to about 20° C. The cooling roller 52 includes a refrigerant passage 53 disposed inside, through which the refrigerant flows. The refrigerant is supplied to the refrigerant passage 53 to cool the cooling roller 52 made of metal. The sheet 20 makes contact with the cooling roller 52 that has been cooled, so that the sheet 20 can be cooled.

In this embodiment, the cooling roller 52 has what is called a double pipe structure. The double pipe structure is formed in one end portion of the shaft part 56, the end portion 56*a*. The refrigerant flows into and out of the cooling roller 52 through one end portion of the shaft part 56, the end portion 56*a*. At the end portion 56*a*, the shaft part 56 includes an inner pipe 56*a*1 and an outer pipe 56*a*2. A refrigerant supply device 52*c* is connected to the inner pipe 56*a*1 and the outer pipe 56*a*2. The refrigerant from the refrigerant supply device 52*c* is supply to the refrigerant passage 53 between the inner pipe 56*a*1 and the outer pipe 56*a*2. The refrigerant supplied from the refrigerant passage 53 at the end portion 56*a* of the shaft part 56 flows toward the refrigerant passage 53 formed in the end portion 54*a* of the roller part 54.

As illustrated in FIG. 4, in the end portion 54*a* of the roller part 54, the refrigerant passage 53 is formed so as to pass between the holes 54*a*1 that are adjacent to each other. In the end portion 54*a* of the roller part 54, a plurality of (four in this embodiment) refrigerant passages 53 are formed. The refrigerant passages 53 extend radially outward of the end portion 54*a*. The supplied refrigerant flows radially outward toward the tubular portion 54*c* of the roller part 54.

In the tubular portion 54*c*, the refrigerant passage 53 is formed circumferentially continuously along the surface of the tubular portion 54*c* (see FIGS. 4 and 5). The refrigerant passage 53 of the tubular portion 54*c* is formed from the end portion 54*a* toward the end portion 54*b* (see FIG. 3). The refrigerant that has reached the tubular portion 54*c* flows toward the end portion 54*b* and also flows in the circumferential direction of the tubular portion 54*c*. Because the refrigerant passage 53 is formed circumferentially continuously, the surface of the tubular portion 54*c* may be cooled circumferentially uniformly. This may reduce temperature variations in circumferential directions. As a result, the sheet 20 that makes contact with the outer surface of the tubular portion 54*c* is more likely to be cooled uniformly. It should be noted that the refrigerant passage 53 may not necessarily be formed circumferentially continuously in the tubular portion 54*c*. For example, the tubular portion 54*c* may include a plurality of refrigerant passages extending from one end to the other end.

In the end portion 54*b* of the roller part 54, refrigerant passages 53 in the same shape as those in the end portion 54*a* are formed. As illustrated in FIG. 3, the refrigerant that has reached the end portion 54*b* flows radially inward in the end portion 54*b* of the roller part 54. The refrigerant flowing through the end portion 54*b* merges at the refrigerant passage 53 formed inside the shaft part 56.

In the shaft part 56, the refrigerant passage 53 is formed along the direction extending from the end portion 56*a* to the end portion 56*b*. The merged refrigerant flows in the refrigerant passage 53 toward the end portion 54*a*. The refrigerant passage 53 is connected to the interior of the inner pipe 56*a*1. Although not shown in the drawings, the end portion of the inner pipe 56*a*1 has an opening. The refrigerant flows inside the inner pipe 56*a*1 and is discharged through the opening. To the opening, a pipe for discharging the refrigerant may be connected. As the refrigerant supply device 52*c*, it is possible to use a refrigerant circulating device that adjusts the temperature of the refrigerant to a predetermined temperature and circulates the refrigerant. In this case, the pipe for discharging the refrigerant may be connected to the refrigerant supply device 52*c*.

Note that the configuration of the cooling roller 52 is not limited to the above-described embodiment. For example, it is possible to employ a configuration in which the refrigerant is supplied from the end portion 56*a* of the shaft part 56, passed through the tubular portion 54*c*, and discharged from the opposite end portion of the shaft part 56, the end portion 56*b*.

In this embodiment, the cooling roller 52 is made of stainless steel. When the cooling roller 52 is made of metal, the cooling roller 52 is more easily cooled. This may improve the cooling efficiency for the sheet 20. Note that the cooling roller 52 is not limited to being made of stainless steel. The surface of the cooling roller 52 that comes into contact with the sheet 20 may be subjected to a surface treatment, such as plating, in order to adjust the smoothness and strength.

In this embodiment, the cooling roller 52 includes the roller part 54 around which the sheet 20 is wrapped so as to be in contact with the sheet 20, and the shaft part 56 configured to be the rotary shaft of the cooling roller 52. The space 55 is formed radially between the shaft part 56 and the roller part 54 of the cooling roller 52. The space 55 formed between the shaft part 56 and the roller part 54 enables the cooling roller 52 to achieve weight reduction. The weight reduction of the cooling roller 52 serves to reduce the tension of the sheet 20 that is necessary to rotate the cooling roller 52, making it easier to reduce the size of the drive devices 32*a* and 62*a*.

Although various embodiments of the disclosure have been described in detail hereinabove, it should be understood that the foregoing embodiments are merely exemplary and are not intended to limit the scope of the claims. It should be noted that various modifications and alterations of the embodiments illustrated hereinabove are also within the scope of the claims. For example, in the foregoing embodiments, the take-up roll 24 is attached to the second shaft 62 of the take-up unit 60 provided downstream of the cooling unit 50, such embodiments are merely exemplary. The second shaft provided for attaching the take-up roll thereto may be provided in the cooling unit that accommodates cooling rollers. The cooling unit may be configured to perform both cooling of a heat-treated sheet and winding up of the sheet.

It should be noted that the present description includes the following items 1 to 10. The following items 1 to 10 are not limited to the embodiments illustrated hereinabove.

Item 1 relates to a heat treatment apparatus. The heat treatment apparatus according to item 1 includes:
- a heat treating unit configured to heat-treat a strip-shaped sheet while transferring the strip-shaped sheet; and
- a cooling unit configured to cool the strip-shaped sheet having been heat-treated in the heat treating unit while transferring the strip-shaped sheet, wherein:
- the cooling unit includes:
  - a cooling roller allowing a refrigerant to flow through an inside thereof; and
  - an outer wall surrounding a space in which the cooling roller is disposed.

Item 2 is the heat treatment apparatus according to item 1 further including a take-up unit in which the strip-shaped sheet having been cooled in the cooling unit is wound.

Item 3 is the heat treatment apparatus according to item 1 or 2, wherein:
- the heat treating unit includes an outer wall surrounding a space in which the strip-shaped sheet is heat-treated;
- the heat treating unit includes a door disposed at an inlet thereof and configured to switch an atmosphere in the heat treating unit and an atmosphere in a space upstream of the heat treating unit from one to the other; and
- the cooling unit includes a door disposed at an outlet thereof and configured to switch an atmosphere in the cooling unit and an atmosphere in a space downstream of the cooling unit from one to the other.

Item 4 is the heat treatment apparatus according to any one of items 1 to 3, wherein the cooling unit is connected to a vacuum pump.

Item 5 is the heat treatment apparatus according to any one of items 1 to 4, wherein the cooling unit includes a plurality of the cooling rollers.

Item 6 is the heat treatment apparatus according to item 5, wherein:
- the plurality of the cooling rollers includes:
  - at least one first cooling roller around which the strip-shaped sheet is wrapped so as to be in contact with a first surface of the strip-shaped sheet; and
  - at least one second cooling roller around which the strip-shaped sheet is wrapped so as to be in contact with a second surface of the strip-shaped sheet.

Item 7 is the heat treatment apparatus according to item 6, wherein:
- each of the at least one first cooling roller and the at least one second cooling roller includes a plurality of cooling rollers; and
- the strip-shaped sheet is wrapped onto the at least one first cooling roller and the at least one second cooling roller alternately.

Item 8 is the heat treatment apparatus according to item 7, wherein each of an interval between adjacent ones of the first cooling rollers and an interval between adjacent ones of the second cooling rollers is less than an outer diameter of the cooling rollers.

Item 9 is the heat treatment apparatus according to item 7 or 8, wherein the plurality of first cooling rollers and the plurality of second cooling rollers are arranged so as to be staggered in height sequentially from front to rear of the cooling unit.

Item 10 is the heat treatment apparatus according to any one of items 1 to 9, wherein:
- the cooling roller includes a roller part around which the strip-shaped sheet is wrapped so as to be in contact with the strip-shaped sheet, and a shaft part configured to be a rotary shaft of the cooling roller; and
- the cooling roller includes a space formed radially between the shaft part and the roller part of the cooling roller.

What is claimed is:

1. A heat treatment apparatus comprising:
- a heat treating unit configured to heat-treat a strip-shaped sheet while transferring the strip-shaped sheet; and
- a cooling unit configured to cool the strip-shaped sheet having been heat-treated in the heat treating unit, while transferring the strip-shaped sheet,
- wherein the cooling unit comprises
  - a cooling roller allowing a refrigerant to flow through an inside thereof,
  - wherein the cooling unit comprises an outer wall surrounding a space in which the cooling roller is disposed,
- wherein the heat treating unit includes an outer wall surrounding a space in which the strip-shaped sheet is heat-treated,
- wherein the heat treating unit includes a door disposed at an inlet thereof and configured to switch an atmosphere in the heat treating unit and an atmosphere in a space upstream of the heat treating unit from one to the other, and
- wherein the cooling unit includes a door disposed at an outlet thereof and configured to switch an atmosphere in the cooling unit and an atmosphere in a space downstream of the cooling unit from one to the other.

2. The heat treatment apparatus according to claim 1, wherein:

the cooling roller includes a roller part around which the strip-shaped sheet is wrapped so as to be in contact with the strip-shaped sheet, and a shaft part configured to be a rotary shaft of the cooling roller, and the cooling roller includes a space formed radially between the shaft part and the roller part of the cooling roller.

3. The heat treatment apparatus according to claim 1, further comprising a take-up unit in which the strip-shaped sheet having been cooled in the cooling unit is wound.

4. The heat treatment apparatus according to claim 1, wherein the cooling unit is connected to a vacuum pump.

5. The heat treatment apparatus according to claim 1, wherein the cooling unit includes a plurality of the cooling rollers.

6. The heat treatment apparatus according to claim 5, wherein the plurality of the cooling rollers includes:

at least one first cooling roller around which the strip-shaped sheet is wrapped so as to be in contact with a first surface of the strip-shaped sheet, and at least one second cooling roller around which the strip-shaped sheet is wrapped so as to be in contact with a second surface of the strip-shaped sheet.

7. The heat treatment apparatus according to claim 6, wherein:

each of the at least one first cooling roller and the at least one second cooling roller includes a plurality of cooling rollers, and the strip-shaped sheet is wrapped onto the at least one first cooling roller and the at least one second cooling roller alternately.

8. The heat treatment apparatus according to claim 7, wherein the plurality of first cooling rollers and the plurality of second cooling rollers are arranged so as to be staggered in height sequentially.

9. A heat treatment apparatus comprising:

a heat treating unit configured to heat-treat a strip-shaped sheet while transferring the strip-shaped sheet; and a cooling unit configured to cool the strip-shaped sheet having been heat-treated in the heat treating unit, while transferring the strip-shaped sheet, wherein the cooling unit comprises a cooling roller allowing a refrigerant to flow through an inside thereof, wherein the cooling unit comprises an outer wall surrounding a space in which the cooling roller is disposed, wherein the cooling unit includes a plurality of the cooling rollers, wherein the plurality of the cooling rollers includes at least one first cooling roller around which the strip-shaped sheet is wrapped so as to be in contact with a first surface of the strip-shaped sheet, wherein the plurality of the cooling rollers includes at least one second cooling roller around which the strip-shaped sheet is wrapped so as to be in contact with a second surface of the strip-shaped sheet, wherein each of the at least one first cooling roller and the at least one second cooling roller includes a plurality of cooling rollers, wherein the strip-shaped sheet is wrapped onto the at least one first cooling roller and the at least one second cooling roller alternately, and wherein each of an interval between adjacent ones of the first cooling rollers and an interval between adjacent ones of the second cooling rollers is less than an outer diameter of the cooling rollers.

* * * * *